United States Patent [19]
Daly

[11] Patent Number: 5,902,426
[45] Date of Patent: May 11, 1999

[54] PROCESS FOR MANUFACTURING AN AIR FLOW VALVE

[75] Inventor: Paul D. Daly, Troy, Mich.

[73] Assignee: Siemens Canada Limited, Chatham, Canada

[21] Appl. No.: 08/921,920

[22] Filed: Aug. 27, 1997

[51] Int. Cl.[6] .................................................. B32B 31/00
[52] U.S. Cl. ........................ 156/64; 156/73.1; 156/242; 156/272.8; 156/309.6; 264/445; 428/64.1
[58] Field of Search .......................... 156/64, 73.1, 242, 156/272.2, 308.2, 309.6; 264/442, 443, 445; 428/64.1

[56] References Cited

U.S. PATENT DOCUMENTS

| | | | |
|---|---|---|---|
| 4,647,325 | 3/1987 | Bach | 156/73.1 |
| 4,798,639 | 1/1989 | Yamaguchi | 156/73.1 |
| 4,859,378 | 8/1989 | Wolcott | 264/445 |
| 5,304,336 | 4/1994 | Karlsson et al. | 264/242 |
| 5,421,718 | 6/1995 | Karlsson et al. | 425/577 |
| 5,435,863 | 7/1995 | Frantz | 156/64 |
| 5,846,377 | 12/1998 | Frantz et al. | 156/359 |

Primary Examiner—James Sells

[57] ABSTRACT

A process for manufacturing an air flow throttle valve assembly in which the valve disc or blade is precisely sized and centered after assembly to the shaft and throttle body by heating and squeezing of the disc, preferably while the shaft is held at a shallow angle to extrude the perimeter slightly out to the bore wall. After cooling, the shaft angle is reset to a slightly greater angle.

15 Claims, 4 Drawing Sheets

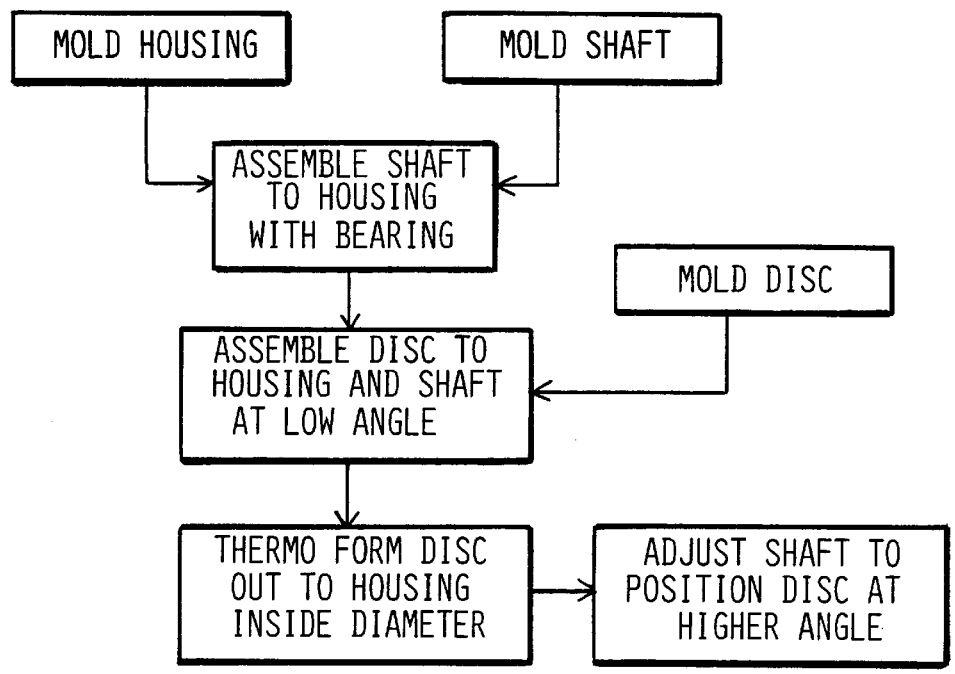
FIG-1
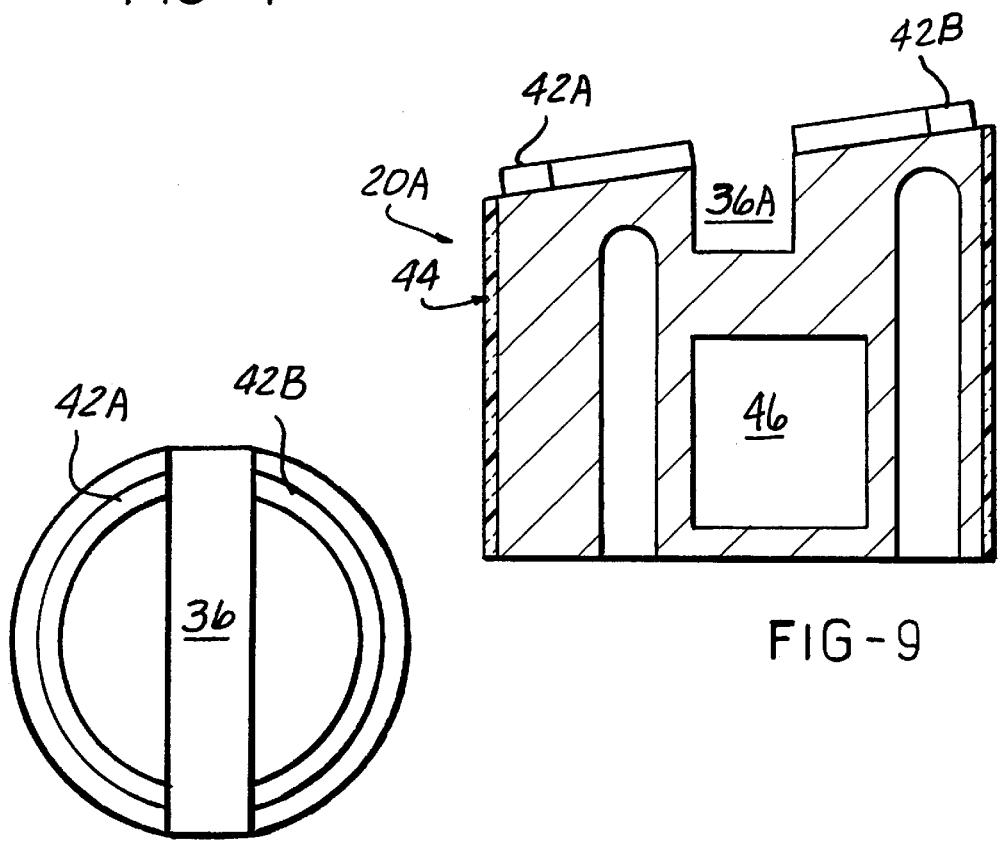
FIG-8
FIG-9

PROCESS FOR MANUFACTURING AN AIR FLOW VALVE

BACKGROUND OF THE INVENTION

This invention concerns techniques for manufacturing assemblies of molded parts.

Recent trends particularly in the auto industry have been to manufacture many parts from molded plastics in order to reduce weight and costs. The engine air intake system is one example in which the intake manifold and air induction ducts and air flow throttle valve are now commonly constructed of molded parts, whereas formerly those parts were constructed of cast and machined metal.

This trend is continuing and as a further development, efforts are being made to mold complete assemblies as of the air flow throttle body and the intake manifold as one molded part.

Air flow valves include a flow control blade or disc fit into a bore in the throttle housing body defining the air flow passage. The disc is pivoted on a shaft to open and close the flow passage, and must fit accurately to be able to rotate between a closed position allowing a low flow of air and open positions. With machined or stamped metal parts, a sufficiently accurate fit has been obtained by a technique of centering the disc at assembly.

The centering of the disc within the bore has in the past been accomplished during assembly by rotating the disc to a closed position to center the disc in the bore, and then fixedly attaching it to the mounting shaft as with screws or by a staking operation.

However, where the valve body and the valve disc are both molded, a difficult manufacturing problem is encountered due to the close tolerances required for a proper fit.

Precision molding techniques have been developed for this purpose, but are only marginally economic.

Advances in plastic molding technology have included techniques for molding assemblies including moving parts. In U.S. Pat. Nos. 5,421,718 and 5,304,336 there is described a process for molding the movable valve disc inside the valve body, using the throttle body bore to size the disc.

A complex mold configuration is required involving movable inserts, etc., as well as multistaged molding steps.

The efforts to achieve an integrated molded manifold and air flow throttle body have involved quite complex mold configurations, such that it does not appear feasible to also mold the disc into the air flow valve body at the same time that the manifold and throttle body are molded.

It is the object of the present invention to provide a manufacturing process for molding an accurately fitted valve disc of an air flow valve which can be carried out without a complex mold configuration such as to be able to be applied to the manufacture of integrated manifold and throttle body components.

SUMMARY OF THE INVENTION

This object is achieved by a process in which the valve disc is separately made as by molding to a size less than the final size such that it can be fit into the throttle body bore with a clearance space.

The disc is then assembled onto the mounting shaft and within the throttle body bore. The shaft is then positioned so that the disc is at a small angle from the fully closed position within the bore.

The disc is of a deformable material so as to able to be resized by being subjected to a secondary reshaping operation in which a tool is inserted into each end of the air flow valve from each end to engage the opposite faces of the disc to squeeze the disc and cause outward flow of material.

Heat energy is applied to cause the disc perimeter to be heated while pressure is exerted on opposite radial faces of the disc by the tools, extruding the disc material out into contact with the surrounding bore walls.

After cooling and removal of the tools, the shaft angle is adjusted to set a fully closed position inclined a few degrees greater than the thermoform press fitting position of the disc.

The disc is accurately sized and centered with respect to the bore with a slight chamfer about its peripheral edge for accommodating its slightly angled closed position.

No increased complexity of the mold is required to mold the air flow valve throttle body and/or an integrated manifold-throttle body.

DESCRIPTION OF THE DRAWINGS

FIG. 1 is a process flow chart depicting the steps in carrying out the manufacturing process steps according to the present invention.

FIG. 8 is a top view of the tooling part shown in FIG. 7.

FIG. 9 is a sectional view through one of the tooling parts inserted into the throttle body bore.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 2:
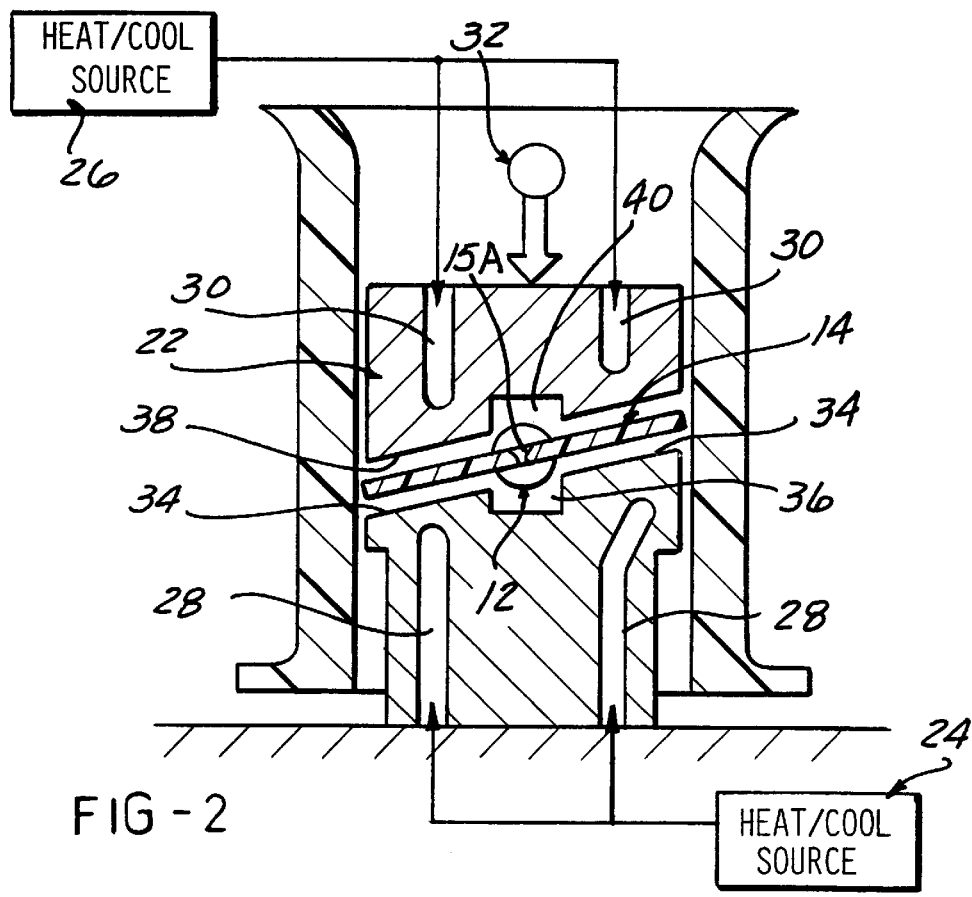
FIG. 2 is a sectional view taken through the air throttle valve subassembly 90° from the section of FIG. 3.

FIG. 1 sets out the steps of the process according to the invention. According to this concept, the parts including the housing throttle body 10 (FIG. 2), the support shaft 12, and disc or blade 14 are molded separately using conventional techniques, the disc being molded to be substantially undersized from the size of the bore 16 in the 25 throttle body 10.

Figure 6:
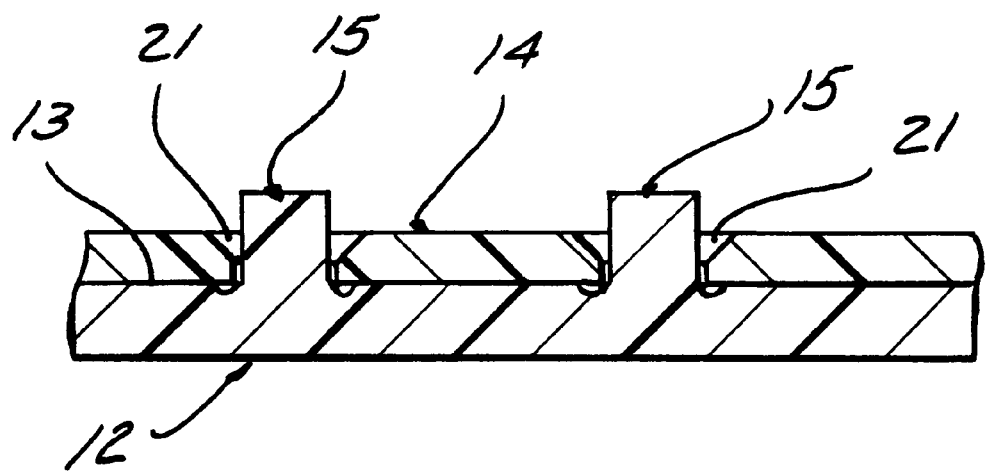
FIG. 6 is an enlarged fragmentary sectional view of the shaft and disc prior to heat staking attachment bosses.
Figure 7:
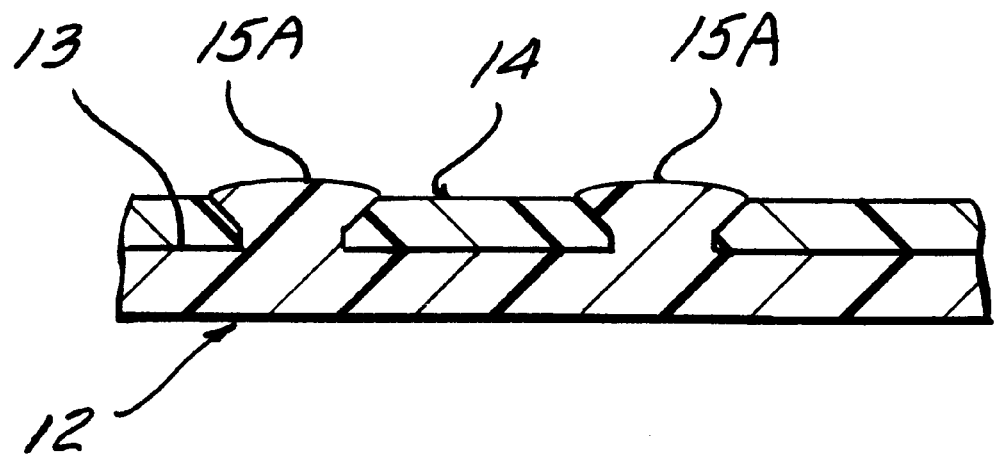
FIG. 7 is the same view as FIG. 6, but shown with the bosses after staking.

The shaft 12 is then assembled to the throttle body housing 10 (with bearings 18) and the disc 14 is then assembled to the shaft 12 with the shaft 12 at a low angle, i.e., 60 after being centered by touching the bore 16 at an outermost point. The disc is preferably fixedly attached at this time by heat staking plug bosses 15 (FIGS. 6 and 7). The details of a preferred heat staked connection are set forth in copending allowed application U.S. Ser. No. 08/596,017, filed Feb. 6, 1997, now U.S. Pat. No. 5,666,988 issued Sep. 16, 1997, assigned to the same assignee as the present application.

As seen in FIGS. 6 and 7, the bosses 15 extend through respective chamfered holes 21 when the disc 12 is laid onto a flat surface 13 formed into the shaft 12.

Prior to staking, there is a clearance between the bosses 15 and the walls of the holes 21 to allow shifting of the disc to be centered. After staking, as with an ultrasonic tool, the staked bosses 15A fixedly attach the disc 14 to the shaft 12.

Next, the blade or disc 14 is finally sized by being thermoformed while in this position, causing the disc material to be forced outwardly or extruded into contact with the bore wall to be precisely sized and centered within the bore 16.

Alternatively, the disc 14 can be left loosely assembled to the shaft 12 during the final sizing operation by leaving the bosses 15 unstaked. The shaft 12 is thereafter rotated in the closing direction to center the disc 15 in the bore 16, the plugs 15 thereafter heat staked to fixedly attach the disc 14 to the shaft 12.

The disc material can be of a lower melting point material than that of the throttle body housing 10 so as to prevent sticking. For example, Nylon 6 could be used for the disc, Nylon 66 for the body 10.

After cooling, the shaft closed angle is set at a slightly greater angle to allow idle air allow, the slight perimeter chamfer formed during the thermoforming operation allowing a slight open angle.

Figure 3:
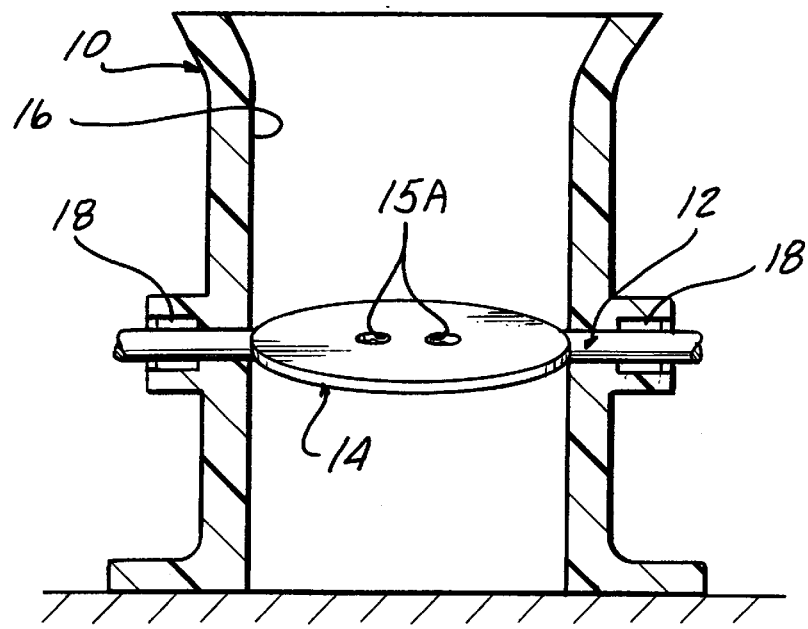
FIG. 3 is a sectional view of an assembled air throttle body and disc with tooling inserted preparatory to a heat sizing operation according to the invention.

FIG. 3 shows in simplified form an apparatus for carrying out the thermoforming of the disc 14.

The apparatus includes a fixed support 20 inserted into the bore 16 from below the disc 14, and a movable piston 22 inserted from above, after lowering the throttle body 10 so as to position the underside.

The support 20 and piston 22 are adapted to be heated as by the flow of heated fluid from a source 24, 26 into cavities 28, 30 (or by an electrical heater coil disposed therein).

The piston 22 is able to be advanced as by an actuator 32 during operation.

The support 20 has an inclined upper surface 34 relieved at 36 to accommodate the shaft 12, and initially the underside of the disc 14 rests on the surface 34 as the throttle body housing 10 is lowered onto the support 20.

The piston 22 has a corresponding inclined surface 38 relieved at 40 to accommodate the shaft 12. The piston 22 is advanced to engage the disc 14 and exert a squeezing pressure on the upper surface of the disc 14.

Figure 4:
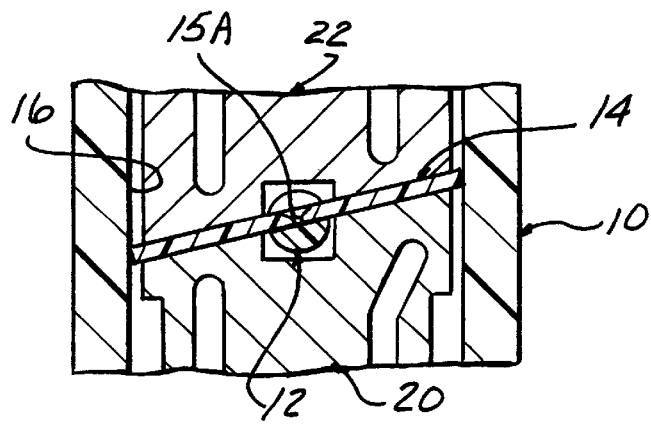
FIG. 4 is a fragmentary sectional view of the completely formed disc installed in the throttle body bore.

Heat conducted from the piston 22 and support 20 causes the material of the disc 114 to be slightly extruded radially outwardly as shown in FIG. 4 until it engages the wall of the bore 16. This may create a slight annular bulge at the perimeter of the disc 14.

Detection of the slightly increased resistance to movement of the piston 22 can be used as a control signal to discontinue the piston advance at this stage.

The support 20 and piston 22 are then allowed to cool, which may be speeded by active cooling prior to withdrawal of the piston 22 and removal of the assembly from the support 20.

Figure 5:
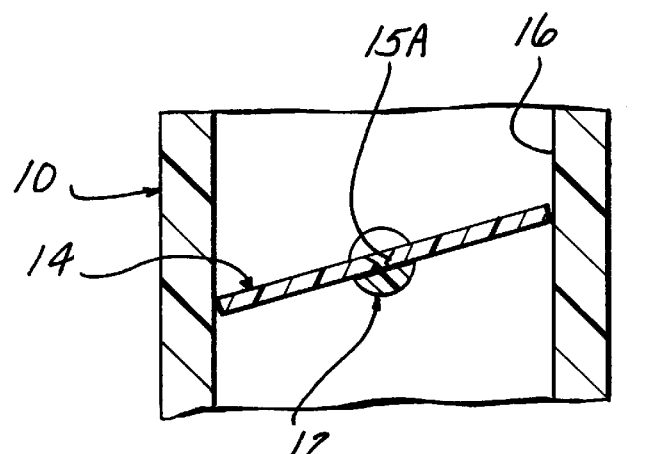
FIG. 5 is a fragmentary sectional view as shown in FIG. 4, but with the disc adjusted to its normal closed position.

Finally, the shaft stop is adjusted to establish a closed position slightly more inclined to have a slight opening about its perimeter, as indicated in FIG. 5.

FIGS. 8 and 9 show details of a refined version of the support 20A, which has narrow curving segments 42A, 42, either semi-circular or semi-elliptical in shape, corresponding to the disc shape. The segments 42A, 42B are affixed on either side of a relieved area 36A to create a raised area recessed in from the outer perimeter of the support 20A. The ring segments 42A, 42B concentrate the extruding pressure in a narrow annular area adjacent the outer perimeter of the disc 14.

An outer heat insulating jacket 44 may also be provided.

A suitably configured inner cavity 46 may also be provided to provide a proper rate of cool down after each forming cycle.

Figure 10:
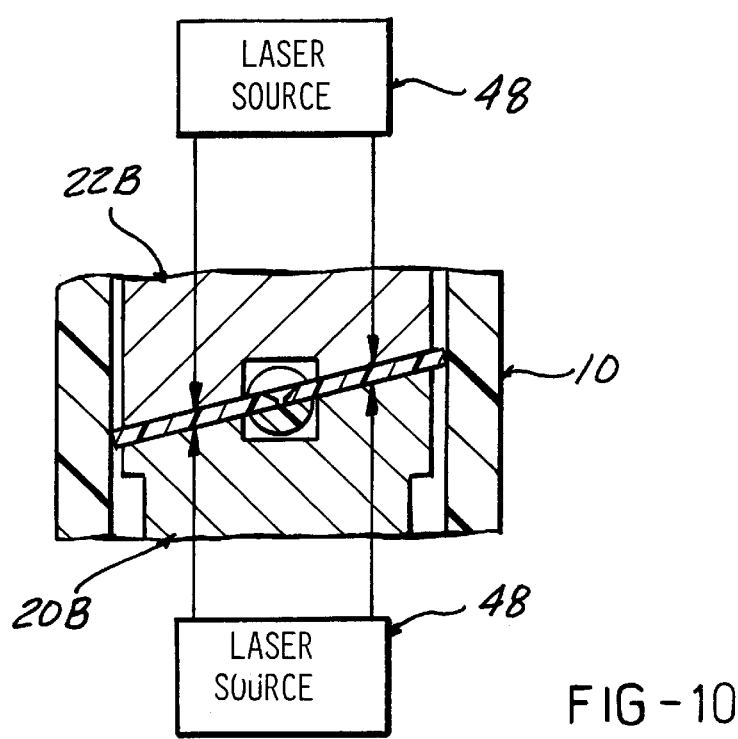
FIG. 10 is a sectional view through an air throttle valve with the disc being formed by the process according to the invention, with a diagrammatic representation of alternate methods of applying heat energy to the disc for thermoforming the disc to size.

Alternate ways of heating the disc 14 can be employed, such as by using one or more laser sources 48 shown in FIG. 10, which generate laser beams passing through piston 22B and support 20B, which are made of a material transparent to the particular laser beam frequency for this purpose to impinge and heat the outer perimeter of the disc 114. This causes appropriate heating of the disc 14 to cause softening sufficient to carry out the extruding process described.

Ultrasonic energy may alternatively be utilized for carrying out the heating process.

I claim:

1. A process for manufacturing an air flow throttle valve comprised of a throttle body formed with an air flow passage comprising a bore extending along an axis through said throttle body, and a valve disc mounted on a pivoted shaft extending across said bore, said process comprising the steps of:

making said throttle body, disc and shaft as separate parts, with said disc constructed of a deformable material and undersized with respect to said bore;

assembling said shaft to said throttle body so as to extend across said bore of said throttle body, and assembling said disc to said shaft within said bore;

finally sizing said disc by deforming said disc to cause said disc material to flow radially outward to a wall defining said throttle body bore.

2. The process according to claim 1 wherein said disc is constructed of a thermoformable material and wherein said deforming step includes the step of heating said disc.

3. The process according to claim 1 further including the step of positioning said shaft and disc so as to orient said disc extending across said bore at a small angle away from normal to said bore axis prior to final sizing of said disc.

4. The process according to claim 2 further including the step of applying pressure to opposite faces of said disc while heating said disc to cause said disc material to be squeezed radially outward to be exactly sized to the inside of said bore, and the step of cooling said disc after being sized.

5. The process according to claim 3 further including the step of setting a closed shaft position at a slightly greater angle than the angle at which said disc is resized.

6. The process according to claim 4 wherein said step of applying pressure to said disc, tools are inserted from opposite ends of said bore and into contact with an opposite radial face of said disc.

7. The process according to claim 6 wherein said step of heating said disc is carried out by heating said tools.

8. The process according to claim 1 wherein said step of heating said disc is carried out by directing a laser beam at the perimeter of said disc.

9. The process according to claim 1 wherein said throttle body is formed by being molded from plastic.

10. The process according to claim 9 wherein said throttle body is molded from a plastic having a higher melting temperature than said disc.

11. The process according to claim 1 wherein said tool pressure is discontinued upon sensing an increase in resistance as said disc material contacts said bore wall.

12. The process according to claim 1 wherein said step of heating said disc includes the step of applying ultrasonic energy to the perimeter of said disc.

13. The process according to claim 1 wherein said disc is fixedly attached to said shaft prior to said final sizing step, whereby said disc is also centered in said bore when being thermoformed to size.

14. The process according to claim 3 wherein said disc is loosely assembled to said shaft during said final sizing step, said shaft is rotated towards a closed position to center said disc, and said disc is thereafter fixedly attached to said shaft to secure said centered position.

15. The air flow throttle valve made by the process of claim 1.

\* \* \* \* \*